March 5, 1929.  J. C. DAWLEY  1,703,992
PUSH AND PULL JACK
Filed June 17, 1925
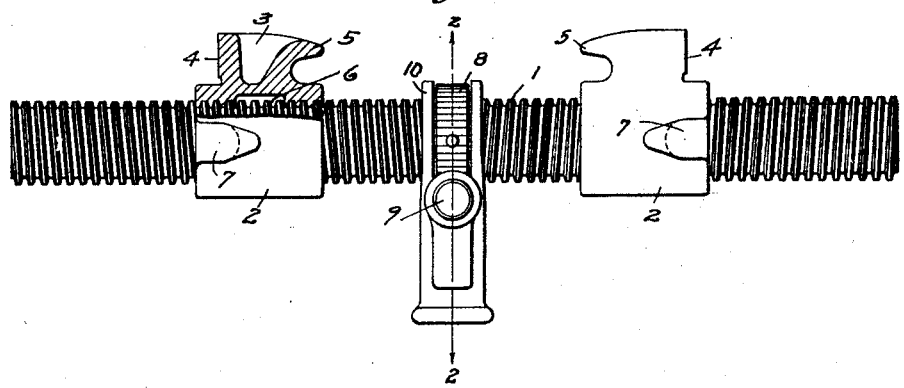
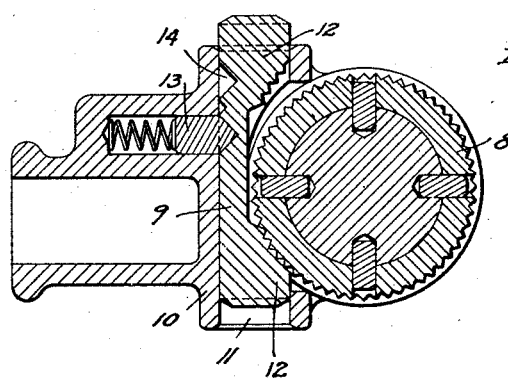
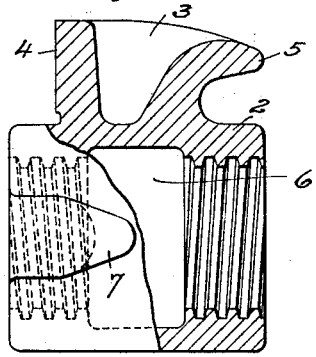 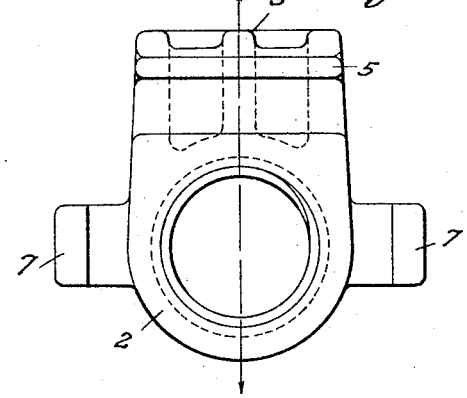
INVENTOR
JAMES C. DAWLEY
BY
ATTORNEY Patented Mar. 5, 1929.

1,703,992

UNITED STATES PATENT OFFICE.

JAMES C. DAWLEY, OF DAYTON, OHIO, ASSIGNOR TO THE JOYCE-CRIDLAND COMPANY, OF DAYTON, OHIO, A CORPORATION OF OHIO.

PUSH AND PULL JACK.

Application filed June 17, 1925. Serial No. 37,621.

This invention relates to push and pull jacks and is designed more particularly for use in the straightening of car sills.

In all metal railroad cars the sills usually comprise two channel beams arranged with their flat faces or webs facing inwardly and when these sills are distorted they must be drawn back or spread apart, as the case may be, in order to straighten the same. This requires a very powerful device which can act either to spread the sills or to draw them together and this device should be of such a character that it can be quickly applied to the sills for either purpose.

The object of the present invention is to provide a powerful jack of this kind which will be simple and compact in construction and in which the sill engaging devices will be of such a character that they may be engaged with the sills for either pulling the same together or spreading the same apart, and will have no unnecessary parts or projections.

In the accompanying drawings Fig. 1 is a side elevation of a jack embodying my invention with one of the nuts partly broken away; Fig. 2 is is a section taken on the line 2—2 of Fig. 1; Fig. 3 is a detail view of one of the nuts partly in section; and Fig. 4 is an end elevation of one of the nuts.

In these drawings I have illustrated one embodiment of my invention and have shown the same as comprising a screw 1 having its opposite end portions provided respectively with right hand and left hand threads. Mounted on each end portion of this screw is a nut 2 which is provided on one side thereof with a laterally extending projection 3 which, if desired, may be cored out, as shown in Figs. 1 and 3. One face of this projection, in the present instance, the outer face, is flat, as shown at 4, and extends transversely to the axis of the nut. This transverse face is spaced a short distance from the adjacent end of the nut so that the end portion of the nut will constitute a bearing or contact surface which will cooperate with the flat face of the projection to engage the corner of a sill or the like. The opposite or inner side of the projection is provided with a lug 5 extending lengthwise of the nut so as to overhang the inner end portion thereof and to thus constitute a hook adapted to engage the flange on the outer side of the sill. By reason of this construction the single projection on the nut will serve to connect the same with the sill for either pulling or pushing action. This is important both from the manufacturing and operating standpoint. It provides greater strength in proportion to the weight because by using a single projection for both pulling and pushing this projection can be given all the necessary strength and the nut will still be of less weight than it would be with two projections, such as have been heretofore used. Further, projections on opposite sides of the nut sometimes interfere with the use of the jack. For example, in certain types of railway cars there are rods or bars directly beneath and close to the sill and when the nut has a projection extending from the lower side thereof as well as from the upper side thereof these rods or bars will interfere with the application of the jack to the sills, and even when the jack can be placed in position it is difficult and sometimes impossible to operate the same because of the engagement of the lower projection with the rod or bar. When the nut has a single projection there is nothing on the lower side thereof to engage the rods or otherwise interfere with the operation of the jack. Each nut preferably has the intermediate portion of its bore cut away, as shown at 6, so as to provide a circumferential channel of greater diameter than the diameter of the screw. By thus eliminating the threads from the center of the nut the nut is prevented from pinching the threads of the screw when twisting strains are imposed upon the projection 3. If desired, the nuts may be provided on one or both sides with hooks 7 adapted to engage the links of chains, by means of which the nuts may be connected with parts which are to be drawn together.

The screw may be rotated in any suitable manner to cause the nuts to be moved toward or from each other. Preferably a ratchet wheel 8 is rigidly secured to the intermediate portion of the screw and is engaged by a pawl 9 carried by a lever socket 10, the two arms of which embrace the ratchet wheel and are pivotally mounted on the screw, at the ends of the threaded portions thereof. The pawl 9 is here shown as a reversible pawl so that it may be used to move the ratchet wheel, and conseqently the screw, in either direction. The ratchet wheel is provided with V-shaped teeth and the pawl is in the form of a block slidably mounted in a guideway 11 and having at each end thereof a head 12 provided on its inner side with teeth adapted to engage the teeth of the ratchet wheel. A spring pressed dog 13 mounted in the lever socket engages in recesses 14 in the outer side of the pawl to retain the same either in an intermediate position or with one or the other of its toothed heads in contact with the ratchet wheel, the arrangement of the dog being such as to permit the pawl to yield and ride over the teeth of the ratchet wheel on its reverse movement.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A push and pull jack comprising a screw having its end portions provided respectively with right hand and left hand threads, nuts mounted on the respective end portions of said screw, each nut having a laterally extending projection provided on one side with a flat contact surface extending transversely to the axis of said nut and provided on its other side with a hook shaped contact portion, the corresponding portions of the projections of the two nuts facing in opposite directions, and means for rotating said screw to move said nuts toward and from each other.

2. A push and pull jack comprising a screw having its end portions provided respectively with right hand and left hand threads, nuts mounted on the respective end portions of said screw, each nut having a laterally extending projection provided on its inner and outer sides with contact portions, the corresponding portions of the projections of the two nuts facing in opposite directions, and means for rotating said screw to move said nuts toward and from each other.

3. A push and pull jack comprising a screw having its end portions provided respectively with right hand and left hand threads, nuts mounted on the respective end portions of said screw, each nut having a laterally extending projection provided on its inner and outer sides with contact portions, the corresponding portions of the projections of the two nuts facing in opposite directions, a ratchet wheel rigidly secured to said screw between the threaded portions thereof, a lever socket pivotally mounted on said screw, and a reversible pawl carried by said lever socket and cooperating with said ratchet wheel to rotate said screw.

4. A push and pull jack comprising a screw having its end portions provided respectively with right hand and left hand threads, nuts mounted on the respective end portions of said screw, each nut having a laterally extending projection provided on its outer side with a flat contact surface extending transversely to the axis of the nut and spaced from the outer end of the nut, said projection also having on its inner side a lug overhanging the inner portion of the nut and constituting a hook, and means for rotating said screw to move said nuts toward and from each other.

5. A push and pull jack comprising a screw having its end portions provided respectively with right hand and left hand threads, nuts mounted on the respective end portions of said screw, each nut having a laterally extending projection provided on its outer side with a flat contact surface extending transversely to the axis of the nut and spaced from the outer end of the nut, said projection also having on its inner side a lug overhanging the inner portion of the nut and constituting a hook, each nut having an intermediate portion of its bore unthreaded and of greater diameter than said screw, and means for rotating said screw to cause said nuts to be moved toward and from each other.

6. A nut for a push and pull jack having a longitudinal bore which is screw threaded to receive an actuating screw, and having a laterally extending projection provided on one side with a contact surface extending transversely to the axis of said nut and provided on its other side with a hook shaped contact portion.

7. A nut for a push and pull jack having a longitudinal bore which is screw threaded to receive an actuating screw, and having a laterally extending projection provided on one side with a flat contact portion extending transversely to the axis of said nut and spaced from the adjacent end of said nut and provided on its other side with a lug overhanging and spaced from the adjacent portion of said nut and extending toward that end of said nut opposite the first mentioned end thereof.

In testimony whereof, I affix my signature hereto.

JAMES C. DAWLEY.